(12) United States Patent
Csiki et al.

(10) Patent No.: US 6,454,084 B2
(45) Date of Patent: Sep. 24, 2002

(54) SUPPORT RAILING FOR A CURVED CONVEYOR PATH

(75) Inventors: Kalman Csiki; Roger Jeppsson, both of Landskrona (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 54 days.

(21) Appl. No.: 09/765,304

(22) Filed: Jan. 22, 2001

(30) Foreign Application Priority Data

Jan. 21, 2000 (SE) .............................................. 0000183

(51) Int. Cl.$^7$ .............................................. B65G 21/16
(52) U.S. Cl. .................................. 198/836.1; 198/836.3
(58) Field of Search .......................... 198/836.1, 836.2, 198/836.3, 837, 842

(56) References Cited

U.S. PATENT DOCUMENTS

| 928,365 | A | * | 7/1909 | Cowley | .................. 198/836.3 |
| 3,236,363 | A | * | 2/1966 | Sutliffe | .................... 198/836.2 |
| 3,581,877 | A | | 6/1971 | Goldberg | |
| 3,666,082 | A | * | 5/1972 | Riggs | ...................... 198/836.1 |
| 4,932,517 | A | | 6/1990 | Johnson | |
| 5,211,280 | A | * | 5/1993 | Houde | ...................... 198/836.3 |
| 5,291,988 | A | * | 3/1994 | Leonard | .................. 198/836.3 |
| 5,782,339 | A | * | 7/1998 | Drewitz | ................... 198/836.3 |
| 6,059,096 | A | * | 5/2000 | Gladieux | ................. 198/836.3 |

FOREIGN PATENT DOCUMENTS

| SE | 507 540 | 6/1998 |
| WO | 98/18698 | 5/1998 |

* cited by examiner

Primary Examiner—Douglas Hess
(74) Attorney, Agent, or Firm—Burns, Doane, Swecker & Mathis, L.L.P.

(57) ABSTRACT

The disclosure relates to a support railing for a curved conveyor path. The support railing is of the type which follows the radius of the curved conveyor path. The support railing is secured in brackets, with at least one bracket in each end of the support railing. The support railing further displays a flexible intermediate section with fixed end pieces in each end of the intermediate section. The flexible intermediate section with its fixed end pieces is telescopically secured in the brackets.

4 Claims, 1 Drawing Sheet

SUPPORT RAILING FOR A CURVED CONVEYOR PATH

Figure 1:
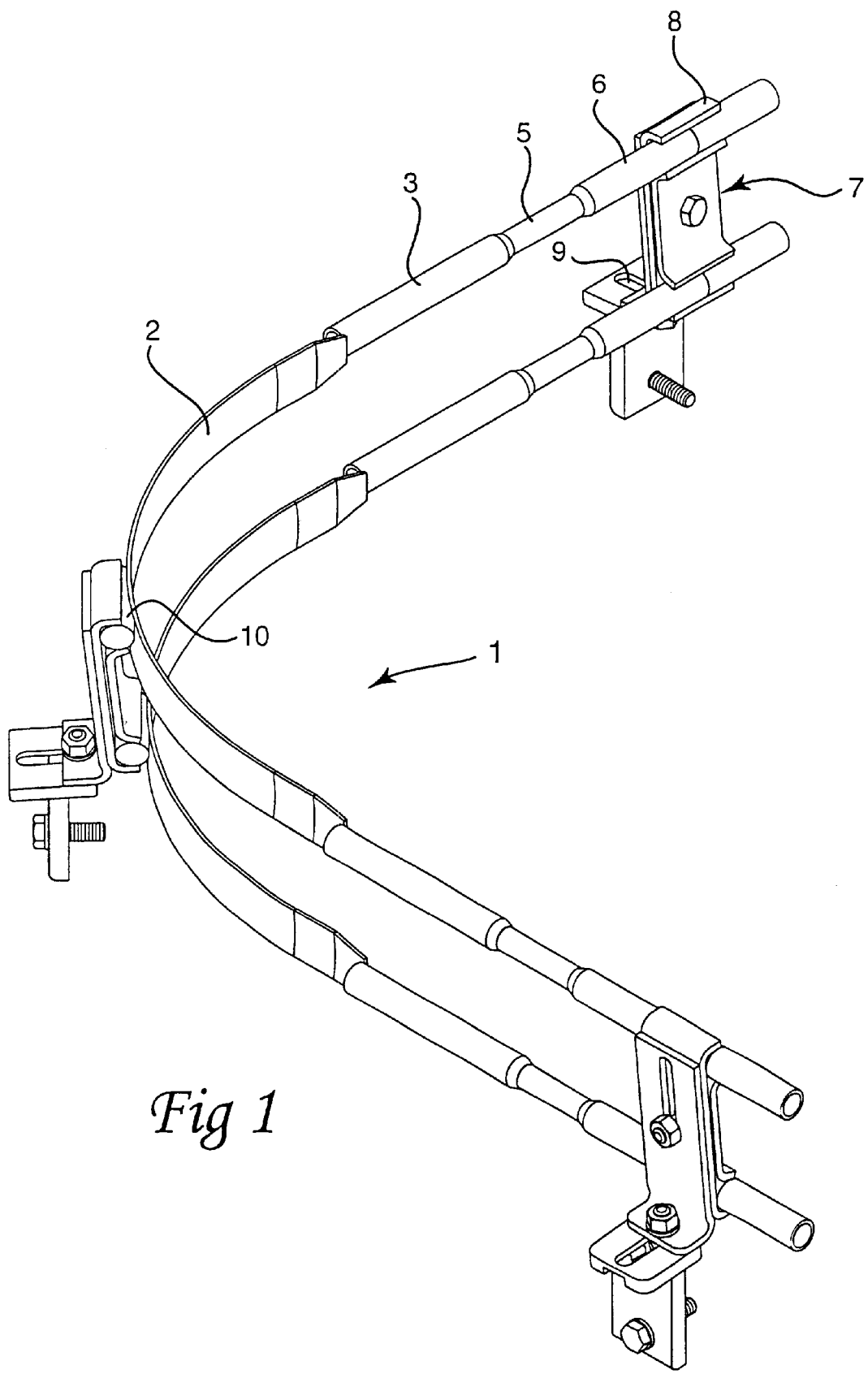

This application claims priority under 35 U.S.C.§§119 and/or 365 to Appln. No. 0000183-4 filed in Sweden on Jan. 21, 2000; the entire content of which is hereby incorporated by reference.

FIELD OF THE INVENTION

The present invention relates to conveyors, and more particularly to support railings for a curved path.

BACKGROUND OF THE INVENTION

In the manufacture of different types of products, it is nearly always desirable to move the product to a packaging station or to further processing. The commonest method of moving small-sized products is to employ conveyors or systems of conveyors. The conveyor paths may consist of endless, driven chains or belts. The conveyors normally have support railings, in particular as far as the transport of products with a high centre of gravity is concerned. Support railings also occur in the art on both sides of the conveyor path and throughout the entire length of the conveyor path. Curved sections of the conveyor path are also enclosed on both sides by support railings.

Use is also made of such conveyors for packages of the single-use disposable type for liquid foods. The packages are filled and sealed and finally formed in a filling machine. After the filling machine, the packages are most generally to be conveyed to ancillary machines which, for example, provide the packages with drinking straws or marshal them together into different distribution units. For example, the package may have parallelepipedic form and they are normally relatively tall in relation to their bottom surface, for which reason they must be supported throughout the entire conveying operation between the different machine units. Packages which topple over can cause operational disruption and may also result in damage to the packages themselves. Above all at the curved sections of the conveyor path, it is therefore necessary to provide an efficient support for the packages. The angle of curvature of the curved sections of the conveyor path may vary from 15° to 180°.

Normally, the conveyor paths are formed after, for example, a filling machine as a permanent installation where the support railings are welded in place and no adjustment of them is possible. Today, the market is showing increasing interest in filling machines which are switchable for the manufacture of packages of different volumes. This entails that the conveyor paths which are connected to filling machines must be capable of being adjusted in response to packages of different sizes. With the adjustment of the conveyor paths, there is an accompanying need to be able to adjust the support railings so that they follow the conveyor path and so that they efficiently support the packages. In particular, this applies to the curved sections of a conveyor path. However, the support railings for the curved sections of the conveyor path offer particular problems, since, on adjustment, there will be differences in extent for both the outer and the inner support railing in a curve.

A support railing for a curved conveyor path which can be adjusted for different path widths is, for example, described in Swedish Patent Specification SE 507 540. The Specification describes an expensive and complex method of adjusting the inner support railing. For the outer support railing, use is merely made of a flexible rail of a plastic material. However, this type of support railing has proved to be incapable of giving the support which is necessary in order to support the packages reliably in a curve.

SUMMARY OF THE INVENTION

One object of the present invention is to realise a support railing which, in a simple manner, can be adjusted for different conveyor path widths and thereby for different package volumes.

A further object of the present invention is that the support railing is to follow the radius of the conveyor path and, in a reliable manner, support the packages at both the outer and the inner regions of the curve.

Yet a further object of the present invention is that the support railing can be rapidly adjusted without the need of special tools.

These and other objects have been attained according to the present invention in that the support railing of the type disclosed by way of introduction has been given the characterising feature that the support railing has a flexible intermediate section and end pieces secured in both ends and telescopically secured in the brackets

BRIEF DESCRIPTION OF THE ACCOMPANYING DRAWING

Preferred embodiments of the present invention will now be described in greater detail hereinbelow, with reference to the accompanying Drawing, in which:

FIG. 1 shows a support railing according to the present invention.

DESCRIPTION OF THE PREFERRED EMBODIMENTS

FIG. 1 shows a support railing 1 for a 90° curve. The support railing 1 according to the present invention may be employed for all regularly occurring curves, i.e. 15, 30, 45, 90 and 180°. The support railing 1 has an intermediate section 2 which is manufactured from a substantially planar metal rail, and this section 2 of the support railing 1 is so flexible that its radius may be altered depending upon what radius the conveyor path has to which the support railing 1 is to be adapted. Those products, for example packages, which are to be conveyed are advanced on the conveyor path. The conveyor path proper is not shown on the Drawing. In the preferred embodiment, the intermediate section 2 is slight arched, with the convex side placed in facing towards the conveyor path. By making the intermediate section 2 slightly rounded, the risk will be avoided that a wholly flat intermediate section 2 will rub against the packages which pass on the conveyor path or which will be stationary on the conveyor path in the event of a queue being formed. The arching of the intermediate section 2 is designed so as not to affect the flexibility of the intermediate section 2.

Each end of the intermediate section 2 is fixedly secured in an end piece 3. The end piece 3 is preferably of round cross section and is, in a first preferred embodiment, formed as a tube. The length of the end piece 3 may be varied and has, in the preferred embodiment, been adapted so that the support railing 1 can be employed for existing conveyor paths. A pin-like member 5 is disposed to be telescopically secured in the tubular end piece 3. The pin-like member 5 is secured on a sleeve member 6 of circular cross section. The sleeve member 6 is of greater cross-sectional area than the pin-like member 5. The sleeve member 6 is held in place by a bracket 7.

In a second preferred embodiment, the end piece 3 is homogeneous and the pin-like member 5 is secured on the end piece 3. The pin-like member 5 is of smaller cross-sectional area than the end piece 3. In this second preferred embodiment, the pin-like member 5 is telescopically secured in the sleeve member 6 which is of tubular formation. The member 6 is held in place by the bracket 7.

The bracket 7 has recesses 8 for two parallel support railings 1. Since the packages which it is intended to convey on the conveyor path together with which the support railing 1 is to be employed have a high point of gravity, use is normally made of two parallel support railings 1 for a more efficient and reliable support for the packages during their transport.

The bracket 7 is secured in the conveyor path and the anchorage holes 9 are, in the preferred embodiment, oblong in order that one and the same bracket 7 will be able to be employed for different conveyor path widths. In the preferred embodiment of the present invention, the support railing 1 has at least one bracket 7 in each end of the support railing 1. FIG. 1 shows a support railing 1 for a 90° curve, and this support railing 1 has an additional bracket 7 placed centrally in the intermediate section 2 of the support railing 1. For those support railings 1 which are intended for 90° or more, at least one additional bracket 7 is required in order to give a stable support railing 1 throughout the entire curved conveyor path. In those cases where extra brackets 7 are required, a metal piece 10 of circular cross section corresponding to the cross section of the sleeve members 6 has been secured on the substantially flat intermediate section 2.

The pin-like member 5 is telescopically secured in the end piece 3 or alternatively in the sleeve member 6 and is disposed to be able to be displaced reciprocally in these parts 3 and 6 in order, by such means, to regulate the distance which is required for the support railing 1 to be able to follow the radius of the curved conveyor path. When the support railing 1 is to follow a conveyor path having a smaller radius, the pin-like member 5 must be slid in the end piece 3 or alternatively in the sleeve member 6 so that a shorter part of the pin-like member 5 is visible. If the curved conveyor path is of larger radius, the pin-like member 5 is drawn out of the end piece 3 or alternatively the sleeve member 6 and a longer section of the pin-like member 5 will be visible. As a result of the design of the support railing 1 according to the present invention, the support railing 1 can be employed for both the inner and the outer part of a curved section of a conveyor path. FIG. 1 shows a support railing 1 for an outer curve. However, the positioning of the brackets 7 must be adapted to the particular use of the support railing 1 and, when the support railing 1 is employed in an inner curve, the brackets 7 must be placed on the other side of the support railing 1.

When the support railing 1 has been adapted to the conveyor path together with which it is to be employed, the pin-like members 5 should suitably be locked in place so as to obtain a steady support railing 1 which cannot unintentionally be altered during the operation of the conveyor. The locking devices for the pin-like members 5 are not shown on the Drawing.

As wil have been apparent from the foregoing desciption, the present invention provides a support railing for a curved section of a conveyor path, the support railing being capable of being rapidly and simply adjusted so that it always follows the radius of the curved conveyor path and which at the same time efficiently supports the packages which are being conveyed on the conveyor path.

The present invention should not be considered as restricted to that described above and shown on the Drawing, many modifications being conceivable without departing from the scope of the appended Claims.

What is claimed is:

1. A conveyor railing for supporting articles advancing in a curved path, comprising: a plurality of brackets for attachment to a conveyor at spaced apart locations along the curved path, and including a flexible intermediate section and end pieces secured to opposite ends of the intermediate section, a tubular sleeve member secured in brackets at opposite ends of the intermediate section, and a pin-like member received at one end in the sleeve member and at the opposite end in the end piece.

2. The conveyor railing as claimed in claim 1, wherein the pin-like member is telescopically received in the end piece.

3. The conveyor railing as claimed in claim 1, wherein the pin-like member is telescopically received at one end in the sleeve member.

4. The conveyor railing as claimed in claim 1, wherein one of the brackets is secured to the intermediate section of the support railing.

\* \* \* \* \*